(12) United States Patent
Budge

(10) Patent No.: US 9,876,244 B2
(45) Date of Patent: Jan. 23, 2018

(54) SYSTEMS AND METHODS FOR STEAM REFORMING

(71) Applicant: LG Fuel Cell Systems Inc., North Canton, OH (US)

(72) Inventor: John R. Budge, Beachwood, OH (US)

(73) Assignee: LG Fuel Cell Systems, Inc., North Canton, OH (US)

( * ) Notice: Subject to any disclaimer, the term of this patent is extended or adjusted under 35 U.S.C. 154(b) by 263 days.

(21) Appl. No.: 14/092,875

(22) Filed: Nov. 27, 2013

(65) Prior Publication Data

US 2014/0087281 A1    Mar. 27, 2014

Related U.S. Application Data

(62) Division of application No. 13/233,874, filed on Sep. 15, 2011, now abandoned.

(51) Int. Cl.
*H01M 8/0662* (2016.01)
*H01M 8/0612* (2016.01)
(Continued)

(52) U.S. Cl.
CPC ............ *H01M 8/0618* (2013.01); *B01J 8/02* (2013.01); *B01J 12/007* (2013.01); *B01J 19/2485* (2013.01); *C01B 3/382* (2013.01); *C01B 3/384* (2013.01); *C01B 3/40* (2013.01); *H01M 8/0675* (2013.01); *B01J 2219/2404* (2013.01); *B01J 2219/2413* (2013.01); *B01J 2219/2428* (2013.01); *B01J 2219/2434* (2013.01); *B01J 2219/2438* (2013.01); *B01J 2219/2446* (2013.01); *C01B 2203/0233* (2013.01); *C01B 2203/0244* (2013.01); *C01B 2203/066* (2013.01); *C01B 2203/107* (2013.01); *C01B 2203/1035* (2013.01);
(Continued)

(58) Field of Classification Search
None
See application file for complete search history.

(56) References Cited

U.S. PATENT DOCUMENTS 4,693,882 A   9/1987  Selzer et al.
5,100,857 A   3/1992  Sato et al.
(Continued)

FOREIGN PATENT DOCUMENTS

CN   1729050 A    2/2006
CN   101346175 A  1/2009

OTHER PUBLICATIONS

Rostrup-Nielsen et al., "Catalytic Steam Reforming", Catalysis, Science and Technologies, 1984, pp. 65, 66, 101.
(Continued)

*Primary Examiner* — Lucas J O'Donnell
(74) *Attorney, Agent, or Firm* — Duane Morris LLP

(57) ABSTRACT

One embodiment of the present invention is a unique method for operating a fuel cell system. Another embodiment is a unique system for reforming a hydrocarbon fuel. Another embodiment is a unique fuel cell system. Other embodiments include apparatuses, systems, devices, hardware, methods, and combinations for fuel cell systems and steam reforming systems. Further embodiments, forms, features, aspects, benefits, and advantages of the present application will become apparent from the description and figures provided herewith.

14 Claims, 3 Drawing Sheets

(51) Int. Cl.
*C01B 3/38* (2006.01)
*C01B 3/40* (2006.01)
*B01J 12/00* (2006.01)
*B01J 19/24* (2006.01)
*B01J 8/02* (2006.01)

(52) U.S. Cl.
CPC ............. *C01B 2203/1064* (2013.01); *C01B 2203/1082* (2013.01); *C01B 2203/1241* (2013.01); *C01B 2203/1258* (2013.01); *C01B 2203/142* (2013.01); *C01B 2203/143* (2013.01)

(56) References Cited

U.S. PATENT DOCUMENTS

| | | |
|---|---|---|
| 6,800,386 B1 | 10/2004 | Wang et al. |
| 7,067,453 B1 * | 6/2006 | Ming ............... B01J 23/462 423/652 |
| 7,166,368 B2 | 1/2007 | Fukunaga |
| 7,182,921 B2 | 2/2007 | Miura et al. |
| 7,378,268 B2 | 5/2008 | Fukunaga et al. |
| 7,670,987 B2 | 3/2010 | Kawashima et al. |
| 7,837,953 B2 | 11/2010 | Shore |
| 7,892,417 B2 | 2/2011 | Fukunaga et al. |
| 7,942,944 B2 | 5/2011 | Katori |
| 7,943,263 B2 | 5/2011 | Brantley et al. |
| 2002/0192136 A1 * | 12/2002 | Baumann ........... B01D 53/8603 423/244.01 |
| 2004/0258587 A1 | 12/2004 | Bowe et al. |
| 2005/0097819 A1 | 5/2005 | Lomax, Jr. et al. |
| 2008/0038186 A1 | 2/2008 | Lomax, Jr. et al. |
| 2008/0102328 A1 | 5/2008 | Saunders et al. |
| 2009/0246600 A1 | 10/2009 | Kadoma et al. |
| 2010/0111781 A1 | 5/2010 | Takahashi et al. |
| 2010/0172826 A1 | 7/2010 | Kowashima et al. |
| 2011/0039686 A1 * | 2/2011 | Li ........................ B01J 23/755 502/38 |

OTHER PUBLICATIONS

Twigg, Catalyst Handbook 2nd Edition, 1989, pp. 278, 279.
Farrauto et al., Catalyst Reviews, 49(2), pp. 141-196, 2007.
Luna et al., Methane Steam Reforming Over Rhodium Promoted Ni/Ai2O3 Catalysts, React. Kin. Catal. Lett., vol. 67, No. 2, pp. 247-252, 1999.
Oudar et al., Deativation and Poisoning of Catalysts, Chemical Industries vol. 20, Marcel Dekker Inc., 1985, pp. 131-133.
International Search Report and Written Opinion, PCT/US2012/055472, LG Fuel Cell Systems Inc., dated Dec. 7, 2012.
State Intellectual Property Office, P.R. China, First Office Action for corresponding Chinese Patent Application No. 201280055799.3 dated Dec. 25, 2015, 4pgs.

* cited by examiner

SYSTEMS AND METHODS FOR STEAM REFORMING

CROSS-REFERENCE TO RELATED APPLICATIONS

The present application is a divisional of U.S. patent application Ser. No. 13/233,874, filed Sep. 15, 2011, which is incorporated herein by reference.

FIELD OF THE INVENTION

The present invention relates to fuel cell systems, and more particularly, to systems and methods for steam reforming a hydrocarbon fuel, e.g., for use in a fuel cell stack.

BACKGROUND

Systems that effectively reform hydrocarbon fuels remain an area of interest. Some existing systems have various shortcomings, drawbacks, and disadvantages relative to certain applications. Accordingly, there remains a need for further contributions in this area of technology.

SUMMARY

One embodiment of the present invention is a unique method for operating a fuel cell system. Another embodiment is a unique system for reforming a hydrocarbon fuel. Another embodiment is a unique fuel cell system. Other embodiments include apparatuses, systems, devices, hardware, methods, and combinations for fuel cell systems and steam reforming systems. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
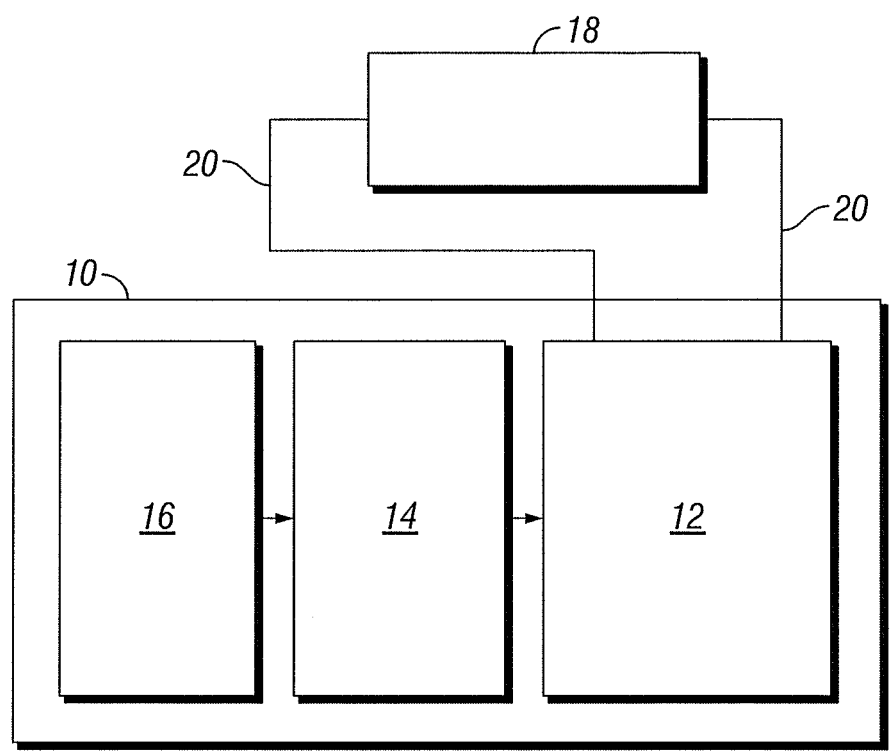
FIG. 1 schematically illustrates some aspects of a non-limiting example of a fuel cell system in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to the drawings, and in particular FIG. 1, a non-limiting example of a fuel cell system 10 in accordance with an embodiment of the present invention is schematically depicted. In one form, fuel cell system 10 is a solid oxide fuel cell system. In other embodiments, fuel cell system 10 may be any other type of fuel cell system, e.g., such as a proton exchange membrane fuel cell system, a molten carbonate fuel cell system, a phosphoric acid fuel cell system, an alkali fuel cell system or any type of fuel cell system configured to operate using a fuel generated by steam reforming a hydrocarbon fuel.

In one form, fuel cell system 10 includes a fuel cell stack 12 and a reformer 14. In some embodiments, fuel cell system 10 may also include a desulfurization system 16 configured to reduce or eliminate sulfur-containing compounds in hydrocarbon fuels supplied to fuel cell system 10. In other embodiments, fuel cell system 10 does not include a desulfurization system. Fuel cell system 10 is configured to provide electrical power to an electrical load 18, e.g., via electrical power lines 20. In one form, fuel cell stack 12 is a plurality of electrochemical cells (not shown). In various embodiments, any number of electrochemical cells may be used to form fuel cell stack 12, electrochemical cells may be physically and electrically arranged in any suitable manner. Each electrochemical cell includes (not shown) an anode, a cathode and an electrolyte disposed between the anode and the cathode.

Reformer 14 is in fluid communication with fuel cell stack 12, in particular, the anodes of fuel cell stack 12. For embodiments so equipped, desulfurization system 16 is in fluid communication with reformer 14. In one form, reformer 14 is a steam reformer. In other embodiments, reformer 14 may take one or more other forms in addition to or in place of being a steam reformer. In one form, reformer 14 is configured to receive steam as a constituent of a recycled fuel cell product gas stream, and receives heat for operation from fuel cell 12 electro-chemical reactions. In other embodiments, other sources of steam and/or heat may be employed. In one form, reformer 14 employs a catalytic reactor configured to receive a hydrocarbon fuel and steam, to reform the mixture into a synthesis gas (syngas). In some embodiments, reformer 14 may be an adiabatic steam reformer. In some embodiments, reformer 14 may also be supplied with an oxidant in addition to the steam and hydrocarbon fuel, and may be configured to reform the fuel using both the oxidant and the steam, e.g., may be configured as an autothermal reformer. In other embodiments, reformer 14 may be configured as an adiabatic or endothermic steam reformer. During fuel cell system 10 operation, the syngas is supplied to the anodes of fuel cell stack 12. In one form, the syngas produced by reformer 14 consists primarily of hydrogen ($H_2$), carbon monoxide (CO), and other reformer by-products, such as water vapor in the form of steam, and other gases, e.g., nitrogen and carbon-dioxide ($CO_2$), methane slip ($CH_4$), as well as trace amounts of higher hydrocarbon slip. In other embodiments, the syngas may have different compositions. The synthesis gas is oxidized in an electro-chemical reaction in the anodes of fuel cell stack 12 with oxygen ions received from the cathodes of fuel cell stack 12 via migration through the electrolytes of fuel cell stack 12. The electro-chemical reaction creates water vapor and electricity in a form of free electrons on the anodes that are used to power electrical load 18. The oxygen ions are created via a reduction of the cathode oxidant by the electrons returning from electrical load 18 into cathodes of fuel cell stack 12.

In one form, the fuel supplied to fuel cell system 10 is natural gas. In a particular form, the fuel is a compressed natural gas (CNG). In other embodiments, other fuels may be employed, in liquid and/or gaseous forms, in addition to or in place of natural gas. For example, in some embodiments, methane and/or liquefied petroleum gas may be employed in addition to or in place of natural gas. In embodiments configured to employ an oxidant in addition to the fuel and steam, the oxidant employed by fuel cell system 10 is air. In other embodiments, other oxidants may be employed, in liquid and/or gaseous forms, in addition to or in place of air.

Figure 2:
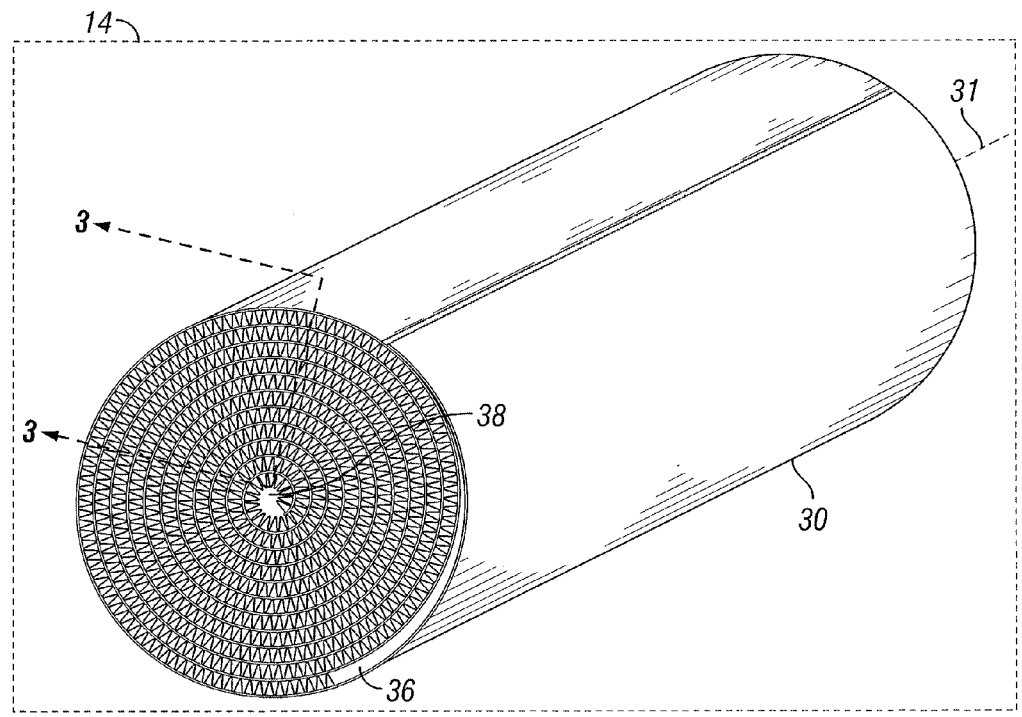
FIG. 2 schematically illustrates some aspects of a non-limiting example of a reformer in accordance with an embodiment of the present invention.
Figure 3:
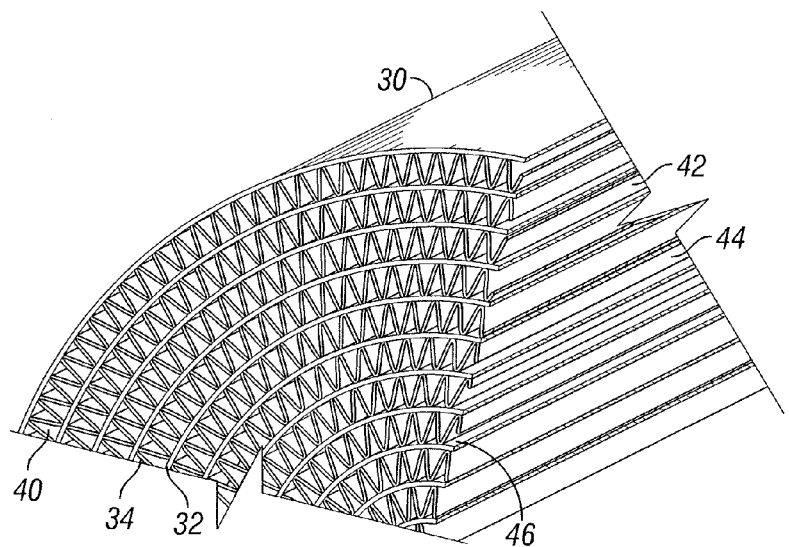
FIG. 3 is an isometric view schematically illustrating some aspects of the non-limiting example of the reformer of FIG. 2.

Referring now to FIGS. 2 and 3, some aspects of a non-limiting example of reformer 14 in accordance with an embodiment of the present invention are schematically depicted. Reformer 14 includes a catalytic reactor 30. Catalytic reactor 30 is the active component of reformer 14 that performs the fuel reforming, e.g., as set forth above. In one form, catalytic reactor 30 is a fixed-bed reactor having a catalyst disposed thereon, wherein the catalyst is retained within a reaction zone in a fixed arrangement. In other embodiments, reformer 14 may incorporate other types of reactors in addition to or in place a fixed-bed reactor, and/or may employ more than one type of fixed bed reactor. Other suitable reactors include, for example and without limitation, fluid bed reactors, e.g., wherein the catalyst is in the form of small particles fluidized by the stream of process gas, e.g., the hydrocarbon fuel, steam, and in some embodiments, an oxidant.

Catalytic reactor 30 includes surfaces onto which the catalyst is deposited for use in steam reforming. The catalyst-laden surfaces are configured to expose the catalyst to hydrocarbon fuel and steam during a steam reforming process, e.g., an endothermic steam reforming process, in accordance with embodiments of the present invention. In one form, catalytic reactor 30 is a monolithic structure. In other embodiments, other fixed-bed reactor schemes may be employed, e.g., catalyst pellets retained by a suitable structure. Suitable monolithic structures include, for example and without limitation, refractory oxide monoliths, metallic monoliths, ceramic foams and/or metal foams. In some embodiments, metallic foams and other metallic structures are desirable for use in steam reforming because they offer higher heat transfer rates required to maintain catalyst activity relative to non-metallic structures or foams. In some embodiments, the catalyst may be disposed on the channels of a heat exchanger for driving endothermic steam reforming reactions, including, for example and without limitation, being disposed on a corrugated metal foil, metal mesh and/or porous metal foam. In other embodiments, the catalyst may be disposed or deposited on other structures, e.g., pellets or other structures. In various embodiments, the catalyst may be deposited via one or more means, including, for example and without limitation, washcoat, vapor deposition and/or other techniques for depositing materials onto desired surfaces, including electroless plating and electrolysis.

In one form, catalytic reactor 30 is formed by stacking together a flat sheet 32 and a corrugated sheet 34, e.g., of metallic foil, and rolling the sheets to form a structure such as that illustrated in FIGS. 2 and 3, having an axis or centerline 31. In other embodiments, catalytic reactor 30 may be formed differently, and/or may take one or more other physical forms. In some cases, excess flow area, e.g., flow areas 36 and 38, may result at some locations, e.g., at the ends of the sheets, e.g., depending upon the size and thickness of the metallic sheet, and depending upon whether the sheets were rolled about a spindle and whether end treatments for the external sheet edges are employed. Any such excess flow areas may be closed by suitable means, e.g., including the use of a filler material. Sheets 32 and 34 form openings 40, which extend along axis 31. The size and shape of openings 40, e.g., formed between the flat and corrugated sheets, may vary with the needs of the application. In one form, catalytic reactor 30 is formed to have openings 40 at a desired size in the range of 200-1200 openings per square inch. In other embodiments, other opening sizes may be employed. It will be understood that the depiction of FIGS. 2 and 3 illustrate an exaggerated opening 40 size for purposes of clarity of illustration. The catalyst is disposed on surfaces within openings 40, e.g., including surfaces 42, 44 and 46 of each opening 40.

In various embodiments, the catalyst may be supported on a suitable carrier. Suitable carriers include, but are not limited to, refractory oxides, such as silica, alumina, titania, zirconia and tungsten oxides and/or mixtures thereof. Other suitable carriers that may be employed in conjunction with or in place of the aforementioned carriers include mixed refractory oxides having at least two cations. Preferred carriers that may be employed alone or in combination with aforementioned carriers include alumina oxides stabilized with oxides, for example and without limitation, baria, ceria, lanthana and magnesia.

The catalyst may be deposited on the carrier by one or more of various techniques, including, for example and without limitation, impregnation, e.g., by contacting the carrier material with a solution of the metals that form the catalyst. In various embodiments, the resulting material may then be dried and calcined. The catalyst may be further activated by heating in hydrogen and/or another reducing gas stream.

It is desirable to provide relatively clean fuel to reformer 14 and fuel cell stack 12. However, some fuels include substances that have deleterious effects upon the systems that receive and/or employ the fuel. For example, in a fuel cell application, such substances may have deleterious effects on the catalyst in reformer 14, the anodes of fuel cell stack 12, and/or other components. Some fuels, such as natural gas and compressed natural gas (CNG), as well as other hydrocarbon fuels, may contain sulfur in one or more forms, e.g., sulfur-containing compounds. For example, some natural gas fuels have a sulfur content in the range of 2-10 parts per million by volume (ppms). Sulfur, e.g., in the form of sulfur-containing compounds, is known to damage certain systems. For example, in a fuel cell system, sulfur-containing compounds may poison the reformer 14 catalyst and/or fuel cell stack 12, e.g., the anodes of fuel cell stack 12.

For embodiments employing a desulfurization system, such as desulfurization system 16, the desulfurization system is configured to remove sulfur (e.g., sulfur-containing compounds) from the fuel. Various embodiments may be configured to remove all or substantially all of the sulfur-containing compounds, or to reduce the content of the sulfur-containing compounds by some amount and/or to some selected level, e.g., an amount or level commensurate with achieving a desired downstream component catalyst life, such as reformer 14 catalyst life and/or fuel cell stack 12 life. For embodiments that do not include a desulfurization system, it is desirable to ensure that the fuel supplied to reformer 14 is sulfur-free or has a low sulfur content, for example and without limitation, approximately 0.05 ppmv or less.

During the operation of fuel cell system 10, conditions may arise wherein reformer 14 is supplied with a high-sulfur content hydrocarbon fuel, e.g., a hydrocarbon fuel having a sulfur content of 1-10 parts per million by volume or greater, e.g., inadvertently. For example, in embodiments employing desulfurization system 16, sulfur breakthrough may occur under some circumstances, or desulfurization system 16 may fail, at least partially. As another example, for embodiments that may or may not include desulfurization system 16, the fuel supplied to fuel cell system 10 may inadvertently include a higher sulfur content than intended. Once the high sulfur content is discovered, remedial action may be taken to reduce the sulfur level. However, the period of time in which reformer 14 is exposed to the high sulfur level may poison the catalyst employed by reformer 14, which may reduce the efficiency of reformer 14. Once poisoned, typical catalysts must be cleaned, which may be time consuming, and in some cases, an expensive process. The degree of poisoning that is considered undesirable depends upon, for example, the particular application and the temperature at which the steam reforming is performed. Other factors may also apply.

However, the inventor has determined that a particular catalyst combination is not only less susceptible to sulfur poisoning, but also exhibits the ability to self-clean relatively quickly after being poisoned by sulfur exposure during stream reforming. The catalyst combination proposed by the inventor is a platinum ruthenium catalyst, that is, a catalyst consisting essentially of ruthenium and platinum as the active catalytic materials. In various embodiments, the catalytically active material may be a platinum-ruthenium alloy, or may be formed of separate ruthenium particles and platinum particles dispersed among each other. In one form, the catalyst does not include akali metals or oxides thereof. In other embodiments the catalyst may include alkali metals and/or oxides thereof. The catalyst is configured for tolerance of sulfur-containing fuels, and for self cleaning of sulfur compounds. In one form, the catalyst is configured for self cleaning of sulfur compounds by performing steam reforming using a low-sulfur-content hydrocarbon fuel. In other embodiments, other procedures may be employed to perform self cleaning. The self-cleaning may be achieved by performing steam reforming at a suitable temperature, e.g., in the range of 650° C. to 900° C., and in some embodiments, in the range of 750° C. to 800° C., with a low-sulfur content fuel, e.g., a hydrocarbon fuel having a sulfur content in the range of 0 to about 0.05 ppmv. The platinum and ruthenium compositions of the platinum ruthenium catalyst may vary over a wide range, although a typical composition may be 0.01 to 10 wt % for platinum and 0.5 to 40 wt % for ruthenium, with the balance of material being the catalyst carrier. In some embodiments, the catalytically active materials of the catalyst may include platinum in amounts ranging from 0.01% to 25% by weight, with ruthenium in amounts ranging from approximately 75% to 99.99% by weight. Because of the relatively high cost of platinum, e.g., relative to ruthenium, in some embodiments, it is desirable to minimize the amount of platinum to an amount consistent with the desired level of sulfur resistance, e.g., for the particular application.

Sulfur is known to have a detrimental effect on ruthenium steam reforming catalysts, e.g., compared to some other catalysts, for example and without limitation, platinum/ rhodium formulations. In addition, ruthenium catalyst regeneration (self-cleaning after exposure to sulfur in the hydrocarbon feed) is known generally to be slow. Hence, one of ordinary skill in the art would not be expected to employ a ruthenium catalyst for steam reforming in system where the catalyst may be exposed to a sulfur-containing fuel. However, the inventor has determined that the addition of platinum to ruthenium as a steam-reforming catalyst provides surprising and unexpected results, not only reducing the adverse impact of poisoning of the catalyst, but also rendering the catalyst to be self-cleaning in shorter times than catalysts formed of ruthenium alone. The inventor posits that the beneficial effect of alloying platinum as part of a platinum-ruthenium catalyst is greater than that which may be expected from a simple replacement of some of the ruthenium with platinum. It is proposed that one potential explanation for the surprising and unexpected results may be that platinum in close proximity to ruthenium may facilitate the desorption of sulfur species bound to the ruthenium. The platinum content may vary with the needs of the application. It is proposed that increased platinum content yields lower susceptibility of the catalyst and faster catalyst regeneration. However, since platinum is more expensive than ruthenium, in some embodiments, the minimum platinum content necessary to achieve a desired catalyst regeneration (self-cleaning) time for the particular application is employed in particular embodiments. In many embodiments, the ruthenium content of the catalyst will be substantially greater than the platinum content. Example 1, below, illustrates one prophetic example of compositional ranges for a catalyst in accordance with an embodiment of the present invention:

Example 1

1-20 wt-% ruthenium-platinum catalytically active component(s) with a ruthenium/platinum weight ratio>3;

50-90 wt-% alumina; and 5-30 wt-% a metal oxide or oxides selected from Groups IIA-VIIA, the Lanthanides and Actinides (e.g. using the old International Union of Pure and Applied Chemistry (IUPAC) version of the periodic table).

Figure 4:
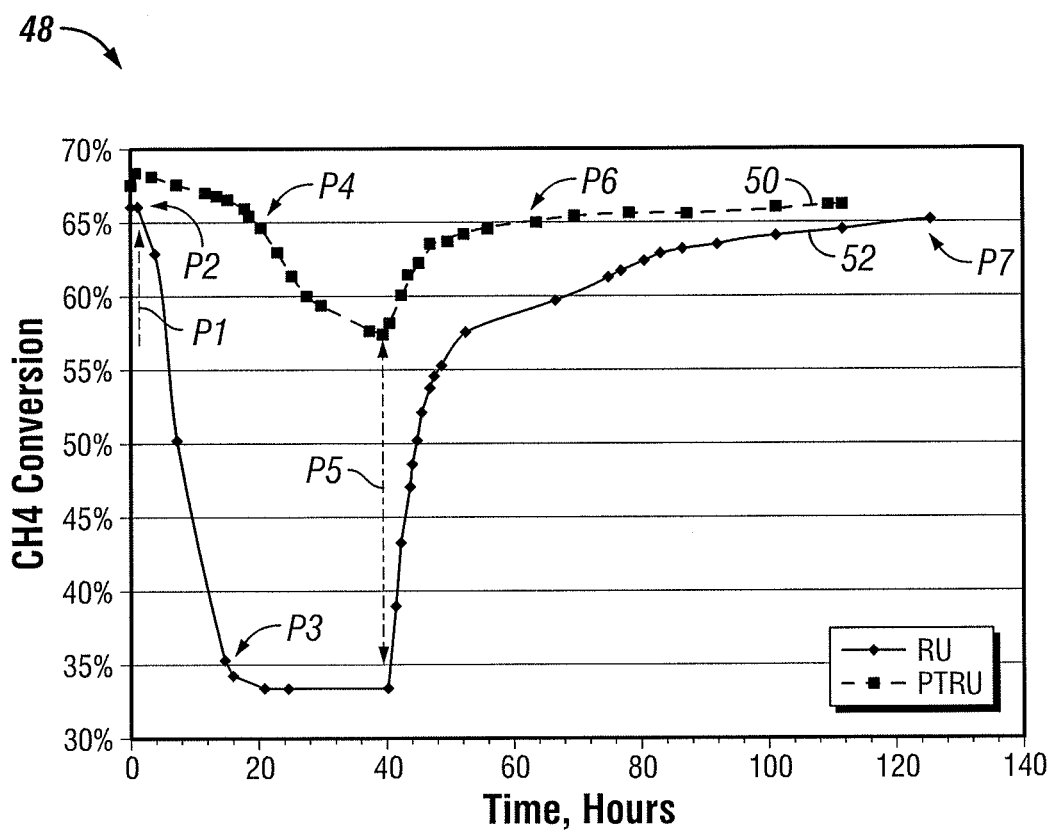
FIG. 4 is a non-limiting example of a plot illustrating catalyst performance for a non-limiting example of a steam reforming catalyst in accordance with an embodiment of the present invention in the presence of sulfur in the feed stream and after removal of sulfur from the feed stream in comparison to a conventional steam reforming catalyst under the same conditions.

Referring to FIG. 4, a non-limiting example of a plot 48 illustrating test results of a platinum ruthenium catalyst as compared to a ruthenium catalyst is illustrated. In particular, the example of FIG. 4 illustrates the effect of sulfur poisoning upon methane ($CH_4$) conversion for two catalysts: a ruthenium catalyst; and a non-limiting example of a platinum ruthenium catalyst in accordance with an embodiment of the present invention. The catalytically active material of the ruthenium catalyst consists essentially of ruthenium, and is 6 wt % in an metal-oxide stabilized alumina washcoat. The catalytically active material of the platinum ruthenium catalyst consists essentially of platinum and ruthenium, with a ruthenium content of 5 wt % and a platinum content of 1 wt % (5:1 weight ratio of ruthenium to platinum) in an metal-oxide stabilized alumina washcoat.

Methane steam reforming is an exothermic reaction, and the methane conversion for a set of conditions may be calculated using the equilibrium constant shown below ($K_{CH4}$):

$$CH_4 + H_2O \longleftrightarrow CO + 3H_2 \, \Delta H°(298K) = 206.2 \text{ kJ·mole}^{-1}$$

$$K_{CH4} = [CO][H_2]^3 / ([CH_4][H_2O])$$

The equilibrium methane conversion is affected by the reaction temperature, pressure and the feed composition. Increasing reaction temperatures favors methane conversion while increasing pressure decreases methane conversion. The observed methane conversion will be dependent on the catalyst activity and the process throughput (GHSV).

The feed stream supplied to the catalysts consisted of a hydrocarbon stream in the form of dry natural gas, and steam, yielding 14.2% by volume $CH_4$ and an $H_2O/CH_4$ ratio of 2.8 supplied at 750° C. and 6.4 bar absolute, with a gas hourly space velocity (GHSV) of 20,942/h. Methane conversion (to syngas) was measured in order to determine the performance of the catalysts, with 65% methane conversion determined to be a minimum target activity level. Under the specified process conditions, a methane conversation of 65% corresponds to about 90% of the equilibrium methane conversion. The hydrocarbon feed stream was initially supplied to both catalysts with a sulfur content of below about 0.05 ppmv. At approximately 1 hour, at a point P1, sulfur was added to the hydrocarbon feed stream in the form of methyl mercaptan in the amount of 716 parts per billion by volume (ppbv) of the hydrocarbon feed stream, yielding 716 ppbv sulfur content in the hydrocarbon feed stream. Curve 50 represents the performance data associated with the platinum ruthenium catalyst, whereas curve 52 represents the performance data associated with the ruthenium catalyst. From FIG. 4, it is seen that the initial performance of the platinum ruthenium catalyst was approximately 68% methane conversion immediately prior to the time of the introduction of the sulfur into the feed stream, and the initial performance of the ruthenium catalyst was approximately 66% methane conversion immediately prior to the time of the introduction of the sulfur into the feed stream. Within less than 1 hour after the sulfur was introduced, the ruthenium catalyst performance fell below the performance threshold of 65% methane conversion, as indicated by a point P2, and fell below 35% methane conversion at approximately 12-13 hours after the introduction of the sulfur, as indicated by a point P3. The performance of the ruthenium catalyst ultimately reached approximately 33% methane conversion prior to the removal of the sulfur from the feed stream. The platinum ruthenium catalyst, on the other hand, remained above the 65% methane conversion threshold until about 20 hours after the introduction of the sulfur, as indicated by a point P4, ultimately dropping to approximately 57% methane conversion by the time the sulfur was removed from the feed stream. The sulfur was removed from the feed stream after approximately 40 hours of steam reforming for each of the catalyst configurations, and is indicated by a point P5. Removal of the sulfur allowed for self-cleaning of the catalysts in the presence of a low sulfur content feed stream. Approximately 20 hours after the sulfur was removed, indicated by a point P6, the performance of the platinum ruthenium catalyst reached the 65% methane conversion threshold, whereas approximately 85 hours was required for the ruthenium catalyst to reach the 65% methane conversion threshold, indicated by a point P7. Thus, as seen from FIG. 4, surprising and unexpected results were obtained by adding a small amount of platinum to a ruthenium catalyst. The surprising and unexpected results included both a reduction in the poisoning of the catalyst due to the presence of sulfur in the feed stream, as well as a reduction in the amount of time required for self-cleaning of the catalyst in the presence of a low sulfur feed stream. As a result, embodiments of the present invention may employ a platinum ruthenium catalyst in a reformer, e.g., for steam reforming, for example, to provide syngas to a fuel cell. A low sulfur hydrocarbon feed stream may be supplied to the reformer, and in the event of an exposure to a high or higher sulfur content hydrocarbon feed stream, poisoning of the catalyst will be reduced, e.g., relative to other catalysts, such as ruthenium catalysts. Further, the recovery time, or time required for self-cleaning, e.g., upon the introduction of a low sulfur content hydrocarbon feed stream or sulfur-free hydrocarbon feed, will be reduced, e.g., relative to other catalysts, such as ruthenium catalysts.

Embodiments of the present invention include a method for operating a fuel cell system, comprising: providing a catalyst consisting essentially of platinum and ruthenium as catalytically active materials, wherein the platinum content is selected based on a desired level of sulfur resistance; and wherein the catalyst is configured for self cleaning of sulfur compounds when performing steam reforming using a low-sulfur-content hydrocarbon fuel; providing a catalytic reactor having surfaces having the catalyst disposed thereon and configured to expose the catalyst to at least a hydrocarbon fuel and steam; reforming a high-sulfur content hydrocarbon fuel with at least steam for a first period of time; reforming the low-sulfur-content hydrocarbon fuel with at least steam for a second period of time; and providing reformed hydrocarbon fuel to a fuel cell stack.

In a refinement, the reforming of the low-sulfur-content hydrocarbon fuel is performed after the reforming of the high-sulfur content hydrocarbon fuel.

In another refinement, the reforming of the low-sulfur-content hydrocarbon fuel is performed both before and after the reforming of the high-sulfur content hydrocarbon fuel.

In yet another refinement, the platinum content is a minimum platinum content consistent with the desired level of sulfur resistance.

In still another refinement, the ruthenium content of the catalytically active materials is selected to be approximately 75% to 99.99% by weight; and wherein the platinum content of the catalytically active materials is selected to be approximately 0.01% to 25% by weight.

In yet still another refinement, the method further comprises providing a carrier for the catalyst.

In a further refinement, the carrier includes a refractory oxide, including at least one of silica, alumina, zirconia and tungsten oxides.

In a yet further refinement, the carrier includes mixed refractory oxides having at least two cations.

In a still further refinement, the alumina oxide is stabilized by at least one of baria, ceria, lanthana and magnesia oxides.

In a yet still further refinement, the method further comprises activating the catalyst by heating the catalyst in hydrogen and/or another reducing gas.

Embodiments of the present invention include a system for steam reforming a hydrocarbon fuel, comprising: a catalytic reactor having surfaces configured for exposure to the hydrocarbon fuel and steam; and a catalyst having catalytically active materials consisting essentially of ruthenium and platinum disposed on the surfaces of the catalytic reactor, wherein the system is configured to steam reform a hydrocarbon fuel.

In a refinement, the ruthenium content of the catalyst is greater than the platinum content of the catalyst.

In another refinement, the catalyst is configured for self cleaning of sulfur compounds when performing steam reforming using a hydrocarbon fuel having little or no sulfur content.

In yet another refinement, the little or no sulfur content is less than about 0.05 parts per million by volume.

In still another refinement, the catalyst is configured for steam reforming with the hydrocarbon fuel having a sulfur content of greater than about 0.1 parts per million by volume for a period of not less than 30 hours; and wherein the catalyst is configured for self cleaning of sulfur compounds when performing steam reforming using a hydrocarbon fuel having little or no sulfur content.

In yet still another refinement, the little or no sulfur content is less than about 0.05 parts per million by volume.

In a further refinement, the sulfur content of greater than 0.1 parts per million by volume is a sulfur content of greater than 0.5 parts per million by volume.

In a yet further refinement, the catalytic reactor includes a tube having an axis, and having a plurality of channels extending parallel to the axis; and wherein the catalyst is disposed in the surfaces of the channels.

In a still further refinement, the number of channels is in the range of 200 to 1200 channels per square inch when viewed in a direction along the axis.

In a yet still further refinement, the catalyst is supported on a carrier that includes alumina oxide.

In an additional refinement, the carrier also includes at least one of baria, ceria, lanthana and magnesia oxides.

In another additional refinement, the catalyst and the carrier do not include alkali metals or oxides thereof.

In yet another additional refinement, the catalyst is configured for self cleaning within a period of 50 hours or less to achieve a methane conversion of greater than 90% of the equilibrium conversion, when using natural gas as a hydrocarbon feed stream.

In still another additional refinement, the catalyst is configured for self cleaning within a period of 40 hours or less to achieve a methane conversion of greater than 90% of the equilibrium conversion.

In yet still another additional refinement, the catalyst is configured for self cleaning within a period of 25 hours or less to achieve a methane conversion of greater than 90% of the equilibrium conversion.

In a further additional refinement, the system further comprises a fuel cell in fluid communication with the catalytic reactor.

In a yet further additional refinement, the catalytic reactor is configured to steam reform the hydrocarbon fuel with or without an oxidant.

Embodiments of the present invention include a fuel cell system, comprising: a fuel cell stack; and a reformer in fluid communication with the fuel cell stack, wherein the reformer includes a catalytic reactor having surfaces configured for exposure to a hydrocarbon fuel and steam; and a catalyst having catalytically active materials consisting essentially of ruthenium and platinum disposed on the surfaces of the catalytic reactor, wherein the reformer is configured to steam reform a hydrocarbon fuel and output reformed fuel to the fuel cell stack.

In a refinement, the reformer is configured to reform a high-sulfur content hydrocarbon fuel with at least steam for a first period of time; and reform a low-sulfur-content hydrocarbon fuel with at least steam for a second period of time.

In another refinement, the catalytic reactor is configured to self-clean sulfur poisoning during the second period of time.

In yet another refinement, the second period of time is less than an amount of time required for a catalyst having a catalytically active material consisting essentially of ruthenium to self-clean.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method for operating a fuel cell system, comprising:
providing a catalyst consisting essentially of platinum and ruthenium as catalytically active materials, wherein the platinum content by weight is selected based on a desired level of sulfur resistance and is less than the ruthenium content of the catalyst; and wherein the catalyst is configured for self cleaning of sulfur compounds when performing steam reforming using a low-sulfur content hydrocarbon fuel;
providing a catalytic reactor having surfaces having the catalyst disposed thereon and configured to expose the catalyst to at least a hydrocarbon fuel and steam;
reforming with the catalyst a high-sulfur-content hydrocarbon fuel with at least steam for a first period of time;
reforming with the catalyst a low-sulfur-content hydrocarbon fuel with at least steam for a second period of time whereby the catalyst, using the low-sulfur content hydrocarbon fuel, self-cleans of sulfur compounds that may be present from poisoning by sulfur exposure during the reforming of the high-sulfur-content hydrocarbon fuel; and
providing reformed hydrocarbon fuel to a fuel cell stack.

2. The method of claim 1, wherein the reforming of the low-sulfur-content hydrocarbon fuel is performed after the reforming of the high-sulfur content hydrocarbon fuel.

3. The method of claim 2, further comprising reforming the low-sulfur-content hydrocarbon fuel before the reforming of the high-sulfur content hydrocarbon fuel.

4. The method of claim 1, wherein the platinum content is a minimum platinum content consistent with the desired level of sulfur resistance.

5. The method of claim 4, wherein the ruthenium content of the catalytically active materials is selected to be approximately 75% to 99.99% by weight; and wherein the platinum content of the catalytically active materials is selected to be approximately 0.01% to 25% by weight.

6. The method of claim 1, further comprising providing a carrier for the catalyst.

7. The method of claim 6, wherein the carrier includes a refractory oxide, including at least one of silica, alumina, zirconia and tungsten oxides.

8. The method of claim 7, wherein the carrier includes mixed refractory oxides having at least two cations.

9. The method of claim 7, wherein the alumina oxide is stabilized by at least one of baria, ceria, lanthana and magnesia oxides.

10. The method of claim 1, further comprising activating the catalyst by heating the catalyst in hydrogen and/or another reducing gas.

11. The method of claim 1, wherein the providing of the catalyst includes providing at least some of the platinum and the ruthenium in the form of a platinum-ruthenium alloy.

12. A method for reforming a fuel, comprising:
   providing a catalyst comprising platinum and ruthenium as catalytically active materials wherein the platinum content by weight is less than the ruthenium content; and wherein the catalyst is configured to desorb sulfur compounds when reforming a low-sulfur content fuel;
   reforming with the catalyst a high-sulfur-content hydrocarbon fuel with at least steam;
   reforming a low-sulfur-content fuel with the catalyst such that the catalyst, using the low-sulfur content fuel, desorbs sulfur compounds which may be bound to the catalyst that may be present from poisoning by sulfur exposure during the reforming of the high-sulfur-content hydrocarbon fuel.

13. The method of claim 12, wherein the ruthenium content is approximately at least three times greater by weight than the platinum content.

14. The method of claim 13, wherein the ruthenium content is approximately five times greater by weight than the platinum content.

* * * * *